United States Patent [19]

Foster et al.

[11] 4,250,057
[45] Feb. 10, 1981

[54] PROCESS FOR PRODUCING A CATALYST COMPRISING A GRAPHITE CONTAINING CARBON, A TRANSITIONAL METAL AND A MODIFYING METAL ION

[75] Inventors: Alan I. Foster, Ashford; Peter G. James, Sunbury-on-Thames; John J. McCarroll, Camberley; Stephen R. Tennison, Weybridge, all of England

[73] Assignee: The British Petroleum Company Limited, Sunbury on Thames, England

[21] Appl. No.: 949,078

[22] Filed: Oct. 6, 1978

Related U.S. Application Data

[62] Division of Ser. No. 847,075, Oct. 31, 1971, Pat. No. 4,163,775.

[30] Foreign Application Priority Data

Nov. 3, 1976 [GB] United Kingdom ............... 45711/76

[51] Int. Cl.$^3$ ..................... B01J 23/58; B01J 21/18; C01C 1/04
[52] U.S. Cl. ..................................... 252/447; 423/363
[58] Field of Search ........................ 252/447; 423/363

[56] References Cited

U.S. PATENT DOCUMENTS

| | | | |
|---|---|---|---|
| 1,068,967 | 7/1913 | Bosh et al. | 423/363 |
| 1,119,534 | 12/1914 | Pier | 423/363 |
| 1,157,253 | 2/1915 | Pier | 252/474 |
| 3,660,028 | 5/1972 | Tamaru et al. | 423/363 |
| 3,697,449 | 10/1972 | Brake | 252/473 |
| 3,770,658 | 11/1973 | Ozaki et al. | 423/363 |
| 3,830,753 | 8/1974 | Ichikawa et al. | 423/363 |
| 4,055,628 | 10/1977 | McCarroll et al. | 423/448 |
| 4,122,040 | 10/1978 | McCarroll et al. | 252/447 |

*Primary Examiner*—P. E. Konopka
*Attorney, Agent, or Firm*—Morgan, Finnegan, Pine, Foley & Lee

[57] ABSTRACT

Catalyst for the synthesis of ammonia from hydrogen comprises (1) as support on graphite containing carbon having (a) a basal plane surface area of at least 100 m$^2$/G (b) a ratio of BET surface area to basal plane surface area of not more than 5:1 and (c) a ratio of basal plane surface area to edge surface area of at least 5:1 and (ii) as active component (a) 0.1 to 50% by weight of a transition metal and (b) 0.1 to 4 times by weight of (a) of a modifying metal or ion selected from the alkali or alkaline earth metals or ions. The modifying metal or ion is actively associated with the transition metal rather than the support.

5 Claims, No Drawings

PROCESS FOR PRODUCING A CATALYST COMPRISING A GRAPHITE CONTAINING CARBON, A TRANSITIONAL METAL AND A MODIFYING METAL ION

This is a division, of application Ser. No. 847,075 filed Oct. 31, 1977, now U.S. Pat. No. 4,163,775.

This invention relates to a catalyst suitable for use in the production of ammonia, to the preparation of such a catalyst and to a process employing the catalyst.

With increased pressure on the world's food resources the demand for nitrogen containing fertilisers based on ammonia has grown rapidly in recent years. Current Haber processes using nitrogen and hydrogen as feedstock generally use a potassium promoted iron catalyst, usually with other promoters such as alumina. These catalysts are reduced in situ from bulk iron oxides before use and operate under severe conditions, e.g., pressures of up to 300 bars and temperatures of 450°–500° C.

The reaction $N_2 + 3H_2 \rightleftharpoons 2NH_3$ is highly exothermic and thus the equilibrium is moved to the right at lower temperatures. However present day commercial catalysts are not sufficiently active at lower temperatures to enable the reaction to reach equilibrium within the short time the reactants are in contact with the catalyst. Activity increases with temperature and therefore a compromise has to be reached.

Recent work by Aika et al, Journal of Catalysis, 27, 424–431 (1972), on the synthesis of ammonia discloses that synthesis over a ruthenium catalyst is promoted by the addition of an alkali metal, particularly when the ruthenium is supported by active carbon or alumina.

Similarly, British patent specification No. 1367112 to Sagami Chemical Research Centre discloses a complex catalyst for ammonia synthesis which comprises (a) at least one alkali metal belonging to Group 1A of the Periodic Table, (b) at least one compound, preferably a halide, oxide or sulphide, of a transition metal selected from the group consisting of Group 4B, Group 5B, Group 6B, Group 7B and Group 8 of the Periodic Table and (c) graphite. The Periodic Table referred to by Sagami is that given in the "Handbook of Chemistry", edited by Norbert Adolf Lange; McGraw-Hill, 1961; pages 56 to 57.

The complex comprises an alkali metal as the electron donor, graphite as the electron acceptor and a transition metal compound. The alkali metal and the transition metal compound are present as intercalates in the graphite lattice. Aika and Sagami both disclose the use of free alkali metal or precursors thereof, such as azides as electron donors.

We have now discovered a catalyst comprising a transition metal and an alkali, alkaline earth metal, lanthanide or actinide ion supported on a high basal plane surface area graphite-containing carbon which is more active than previous catalysts, thus enabling higher conversions to be achieved.

Such a catalyst is not an electron donor-acceptor complex nor is it an intercalate compound.

Our British patent specification No. 38183/74 discloses a method for preparing a graphite-containing carbon having (1) a basal plane surface area of at least 100 m$^2$/g, (2) a ratio of BET surface area to basal plane surface area of not more than 5:1 and (3) a ratio of basal plane surface area to edge surface area of at least 5:1.

The graphite-containing carbon comprises a crystalline layered structure in which the constituent atoms form layers attached to each other by relatively weak Van der Waals dispersion forces. The crystalline surface area of the material is formed largely of the basal planes of the layers with a smaller contribution from the edges of the layers. There will usually be some amorphous carbon associated with the crystalline material.

The basal surface area is determined by measuring the heat of adsorption of n-dotriacontane from n-heptane. Similarly the edge surface area is determined by the heat of adsorption of n-butanol from n-heptane.

Heats of adsorption can be measured using a flow microcalorimeter as described in "Chemistry and Industry" for 20th March, 1965, at pages 482–485.

The BET surface area is the surface area determined by the nitrogen adsorption method of Brunauer, Emmett and Teller disclosed in J. Am. Chem. Soc. 60, 309, (1938). This corresponds to the total surface area, i.e., the crystalline basal plane surface area, the crystalline edge surface area and the amorphous surface area.

Thus according to the present invention there is provided a catalyst comprising (i) as support a graphite-containing carbon having (a) a basal plane surface area of at least 100 m$^2$/g, (b) a ratio of BET surface area to basal plane surface area of not more than 8:1, preferably not more than 5:1 and (c) a ratio of basal plane surface area to edge surface area of at least 2:1 and preferably at least 5:1 and (ii) as active component (a) 0.1 to 50%, preferably 1–30%, most preferably 5–10% by weight of a transition metal of the 4th, 5th and 6th horizontal Periods of Groups VB, VIB, VIIB and VIII of the Periodic Table expressed as % by weight of total catalyst and (b) 0.1 to 4 times by weight of (a) of a modifying metal ion selected from Groups IA or IIA of the Period Table or the lanthanides or actinides, the modifying metal ion being actively associated with the transition metal rather than the support.

Unless otherwise indicated the Periodic Table referred to in this specification is the Periodic Table published on page B-4 of the Handbook of Chemistry and Physics, 57th Edition 1976–1977, published by CRC Press, Cleveland, Ohio.

The preferred transition metals are cobalt, ruthenium and rhodium. Ruthenium is the most preferred.

Preferred components (b) are the alkali and alkaline earth metal ion. The most preferred are rubidium and barium.

The graphite-containing carbon may be prepared by the method disclosed in British patent specification No. 1468441 comprising the steps of (1) an initial heat treatment in an inert atmosphere at a temperature between 900° and 3300° C., (2) an oxidation stage at a temperature between 300° and 1200° C., and (3) a further heat treatment in an inert atmosphere at a temperature between 1000° and 3000° C., preferably between 1400° and 2100° C.

Such a method produces a graphite-containing carbon support having a basal plane surface area of at least 100 m$^2$/g, a ratio of BET surface area to basal plane surface area of not more than 5:1 and a ratio of basal plane surface area to edge surface area of at least 5:1. This is the preferred support. However, by eliminating one or two of the above steps, supports can be produced which although lower in basal plane surface area still contain sufficient of the latter to provide satisfactory catalyst supports.

Preferably the carbon initially has a BET surface area in the range 100 to 3000 m²/g.

In Steps (1) and (3) nitrogen provides a suitable atmosphere for temperature up to 1000° C. Above this, an inert gas, e.g., argon or helium, should preferably be used. In Step (2) suitable oxidising media include air, steam and carbon dioxide. If air is employed, the temperature is preferably in the range 300° to 450° C.; if steam or carbon dioxide, in the range 800° to 1200° C.

During the heating in the inert atmosphere a portion at least of the carbon is converted to graphite, and it is believed that adsorbed organic oxygen-containing groups such as ketones, hydroxyl, carboxylic acids and the like are removed.

Preferably the basal plane surface area is at least 150 m²/g. If the basal plane area is greater than 1000 m²/g, however, it is unlikely to have sufficient strength for a catalyst support.

The closer that the ratio of the BET surface area to the basal plane area is to the theoretical minimum of 1, the higher is the quality of the material, i.e., the higher is the proportion of graphite basal plane area and the lower is the proportion of amorphous carbon surface area.

Preferably the ratio of the basal plane surface area to the edge surface area is greater than 5:1, most preferably greater than 30:1.

Preferably the graphite-containing carbon has a pH in the range from 5 to 9, more preferably from 6 to 8, most preferably about 7, and contains less than 1% by weight of adsorbed oxygen, more preferably less than 0.5% by weight of adsorbed oxygen. The lower the proportion of adsorbed oxygen, the closer is the pH to 7.

The particle size of the graphite-containing carbon is not significant and can be controlled in known manner in view of its intended application, ranging from fine particles for use in slurry processes to granules for use in fixed bed processes.

The graphite-containing carbon may be prepared from many different forms of carbon, including (a) activated carbons derived from coconut charcoal, coal, peat, etc., (b) carbons produced by the coking of petroleum residues, and (c) oleophilic graphite, e.g., as prepared according to our British patent specification No. 1168785.

Preferably the carbon employed as a starting material is one which, prior to heat treatment as above, has a BET surface area of at least 500 m²/g.

The preparation of the graphite-containing carbon varies according to the type of carbon selected and utilises combinations of heat treatment under inert and oxidising conditions chosen so as to optimise the ratios of BET to basal plane areas and basal plane to edge surface areas.

The present invention is based on the finding that small amounts of Group IA, IIA, lanthanide or actinide metal ions added to a transition metal catalyst supported on high surface area graphite-containing carbon give a marked increase in catalytic activity.

The catalyst may be prepared by simple impregnation techniques.

Thus according to another aspect of the present invention there is provided a method for the preparation of a catalyst as hereinbefore described which method comprises the steps of impregnating a graphite-containing carbon as hereinbefore described with a solution of a compound of a transition metal of the 4th, 5th and 6th horizontal Periods of Groups VB, VIB and VIII of the Periodic Table to give the desired concentration of the transition metal, earth and adding a solution of a Group IA, IIA lanthanide or actinide metal compound to give the desired concentration of the modifying metal ion.

Suitable transition metal compound solutions are aqueous solutions of halides and nitrates, and organic solutions of acetylacetonates. After impregnation the catalyst may be dried, e.g., at 100°–150° C. for 1–24 hours.

Suitable impregnating solutions of the Group IA, IIA, lanthanide or actinide compounds may be prepared from such salts as nitrates, carbonates and acetates.

After impregnation, the impregnated support should be dried, e.g., at 100° to 150° C. for 1 to 24 hours.

The order of addition is not significant. It will generally be necessary to carry out a reduction step after each impregnation. The reduction may be carried out in a stream of hydrogen.

Prior to the introduction of the feedstock to be processed the catalyst if not previously reduced should be heated in a reducing atmosphere, preferably a stream of hydrogen flowing at a rate of 500–10,000 v/v/hr.

We have discovered that a catalyst according to the present invention is particularly suitable for use in the production of ammonia. It may also be used as a catalyst for the Fischer-Tropsch reaction.

Thus according to another aspect of the present invention, there is provided a process for the production of ammonia which process comprises passing a feedstock containing nitrogen and hydrogen over a catalyst as hereinbefore described under conditions of temperature, pressure and space velocity such that conversion to ammonia is effected.

The catalyst has a high tolerance of poisons which are normally harmful to conventional catalysts, such as water and carbon monoxide.

Synthesis gas is a suitable feedstock.

Broad and preferred ranges of process conditions are as follows:

|  | Broad Range | Preferred Range |
| --- | --- | --- |
| Temperature °C. | 250–600 | 300–500 |
| Pressure bars(ga) | Atmospheric–300 | 20–200 |
| Space Velocity v/v/hr | 1,000–100,000 | 5,000–30,000 |

The invention is illustrated with reference to the following examples.

EXAMPLE 1

Activated carbon AC40 supplied by CECA Ltd was heat treated to 900° C. in nitrogen (to remove undesirable aromatic residues) and the heat treatment continued to 1500° C. in argon. It was then oxidised in air at 425° C. to 23% weight loss. The oxidised carbon was then heated to 1700° C. in argon to form a graphite-containing carbon which was then ground to 16–30 mesh BSS.

Surface area measurements are given below:

| N₂ BET area | m²/g | 565 |
| --- | --- | --- |
| Basal area | m²/g | 218 |
| Edge area | m²/g | 8 |

A catalyst was then prepared by the following technique.

The graphite-containing carbon was impregnated with a 10% aqueous solution of ruthenium trichloride. Water was evaporated off in a rotary evaporator and the material dried in an oven at 110° C. It was then reduced in a stream of hydrogen at 450° C. for 2 hours.

Impregnation and reduction were then repeated.

Potassium was then added by impregnating with a 20% solution of potassium nitrate, evaporating and drying.

The catalyst finally contained 16.6% by weight of ruthenium and 9.6% by weight potassium.

The catalyst was then used to promote the formation of ammonia from a stoichiometric mixture of nitrogen and hydrogen under various conditions of temperature, space velocity and pressure.

The following results were obtained:

| Pressure bars(ga) | Space Velocity GHSV | Reactor Temperature °C. 491 Ammonia Yield % | 464 Ammonia Yield % | 437 Ammonia Yield % |
|---|---|---|---|---|
| 69 | 20,000 | 8.4 | 10.3 | 10.3 |
|  | 10,000 | 8.6 | 10.3 | 11.7 |
|  | 5,000 | 8.6 | 10.3 | 11.8 |
| 35 | 20,000 | 5.2 | 6.0 | 6.8 |
|  | 10,000 | 5.2 | 6.2 | 7.7 |
|  | 5,000 | 4.9 | 6.2 | 7.9 |
| 7 | 20,000 | — | — | 1.9 |
|  | 10,000 | — | — | 2.0 |
|  | 5,000 | — | — | 2.0 |

EXAMPLE 2

By way of comparison, similar test runs were carried out using a commercial iron catalyst. The following results were obtained:

| Pressure bars(ga) | Space Velocity GHSV | Reactor Temperature °C. 491 Ammonia Yield % | 437 Ammonia Yield % |
|---|---|---|---|
| 69 | 20,000 | 7.4 | 4.8 |
|  | 10,000 | 8.3 | 6.0 |
|  | 5,000 | 8.9 | 7.2 |
| 35 | 20,000 | 4.6 | 1.7 |
|  | 10,000 | 5.1 | 2.4 |
|  | 5,000 | 5.4 | 3.4 |
| 7 | 20,000 | 1.5 | 0.3 |
|  | 10,000 | 1.5 | 0.6 |
|  | 5,000 | 1.5 | 0.9 |

EXAMPLE 3

A further experiment was then carried out to demonstrate the catalyst's ability to produce ammonia at higher pressures. The catalyst support was prepared from Black Pearls 2 (BP2) (sold by the Cabot Corporation) by heat treatment to 1000° C. in nitrogen followed by heat treatment to 2600° C. in argon.

The resulting graphite-containing carbon had the following surface area characteristics:

| $N_2$ BET area | $m^2/g$ | 220 |
|---|---|---|
| Basal area | $m^2/g$ | 235 |
| Edge area | $m^2/g$ | 0.3 |

The catalyst was prepared by adding 10% weight ruthenium to the support by impregnation from an aqueous solution of ruthenium chloride. After reduction at 500° C. in hydrogen for 2 hours 20% weight rubidium was added from an aqueous solution of rubidium carbonate. After a further heat treatment at 500° C. in nitrogen the catalyst was ready for use.

Using a 50 ml catalyst bed and a flow rate of 500 l/hr (10,000 GHSV) the ammonia yields were determined at pressures of 69 bars(ga), 100 bars(ga) and 150 bars(ga).

| Average Bed Temperature °C. | % Ammonia Yield | | |
|---|---|---|---|
|  | 69 bars(ga) | 100 bars(ga) | 150 bars(ga) |
| 425 | 6.0 | 6.0 | 6.0 |
| 450 | 8.75 | 10.5 | 10.5 |
| 475 | 10.20 | 13.5 | 13.5 |
| 500 | 11.20 | 14.2 | 19.0 |
| 525 | 9.0 | 12.5 | 20.5 |

The catalyst shows no loss of activity in the kinetic region of the results on increasing the pressure from 69 to 150 bars(ga).

At 150 bars(ga) the maximum yield obtained with a commercial magnetite catalyst was 15.5% at 490° C. (Example 3(a)).

The maximum ammonia yield obtained with the catalyst of Example 3 was approximately 30% higher than that achieved with the magnetite catalyst of Example 3(a).

Two catalysts were then prepared by significantly different routes to examine the effects of catalyst preparation on ammonia yield.

EXAMPLE 4

5% weight ruthenium was added to PP2 heat treated at 2600° C. by one stage impregnation of the method described in Example 1. After the reduction step 10% weight rubidium was added from an aqueous solution of rubidium carbonate. After drying the catalyst was further heat treated to 450° C. in nitrogen.

The catalyst was then reduced in flowing hydrogen (10 ml/min) by programming the temperature to 450° C. at 10° C. per minute. At 450° C. the hydrogen was replaced with a 3:1 $H_2/N_2$ mixture and pressurised to 5.17 bar(ga).

Using a catalyst bed of 0.33 g and a flow rate of 1000 GHSV the ammonia yield was 3.48% at 360° C.

EXAMPLE 5

10% weight rubidium was added to BP2 heat treated at 2600° C. from an aqueous solution of rubidium carbonate. After drying and heat treating at 450° C. in nitrogen, 5% weight ruthenium was added from a toluene solution of ruthenium III acetylacetonate (Acac). This was then pre-reduced in hydrogen at 450° C.

The catalyst was tested as in Example 4 and gave 4.27% ammonia at 340° C.

EXAMPLES 6–17

The effects of the Group IA, Group IIA and lanthanide/actinide series metals as dopants was also investigated in Examples 6-17. The catalysts were prepared as in Example 5, i.e., the dopant was added first and the ruthenium from a toluene solution of Ru (Acac)$_3$ second. All the catalysts except those indicated (*) contained 5% weight ruthenium and 0.12 mol % of the dopant (equivalent to 10% weight Rb).

| Example | Dopant | Dopant % weight | Ammonia Yield % | T max °C. |
|---------|--------|-----------------|-----------------|-----------|
| 6 | Li | 0.7 | 1.9 | 400 |
| 7 | Na | 2.7 | 1.8 | 420 |
| 8 | K | 4.7 | 2.3 | 420 |
| 9 | Cs | 16.0 | 1.8 | 420 |
| 10 | Mg | 2.9 | 0.41 | >450 |
| 11 | Ca | 4.8 | 1.1 | 450 |
| 12 | Ba | 16.4 | 2.5 | 400 |
| 13 | Rb | 10.0 | 2.5 | 400 |
| 14 | *5% Ru/Ce | 10.0 | 0.80 | 450 |
| 15 | *5% Ru/La | 10.0 | 0.90 | 450 |
| 16 | 3% Ru/Yb | 10.0 | 0.89 | >500 |
| 17 | *3% Ru/Dy | 10.0 | 0.89 | >500 |

T max is the temperature at which maximum conversion was achieved.

EXAMPLES 18-23

The effects of varying the carbon support parameters was also investigated in Examples 18-23. An active carbon supplied by British Ceca, AC40, was used as the starting material. This was modified by heat treatment to 1500° C. in argon followed by oxidation in air at 450° C. to 20% weight loss and a secondary heat treatment in argon to temperatures of 1500° C. and 1700° C.

Rubidium and ruthenium were then added as in Example 5 to give catalysts containing 5% weight Ru and 10% weight Rb. The following results were obtained.

| Example | Carbon Type | Basal | Edge | BET | Basal/Edge Ratio | Ammonia Yield % | T Max °C. |
|---------|-------------|-------|------|-----|------------------|-----------------|-----------|
| 18 | AC40 | 177 | 58.6 | 1300 | 3.02 | 1.6 | 420 |
| 19 | AC40/1500 | 278 | 11 | 700 | 25.3 | 3.2 | 370 |
| 20 | AC40/1500/−20% | 440 | 43.5 | | 10.11 | 1.6 | 430 |
| 21 | AC40/1500/−20%/1500 | 446 | 11.4 | 943 | 35.12 | 4.5 | 340 |
| 22 | AC40/1500/−20%/1700 | 395 | 18.8 | 685 | 21.01 | 3.6 | 360 |
| 23 | BP2/2600 | 235 | 0.3 | 220 | 2700 | 5.10 | 340 |

EXAMPLES 24-27

Further tests were carried out using 10% Ru/10% K prepared as in Example 4.

| Example | Carbon Type | Basal Area m$^2$/g | Edge Area m$^2$/g | Basal/Edge Ratio | Ammonia Yield % | T Max °C. |
|---------|-------------|--------------------|--------------------|------------------|-----------------|-----------|
| 24 | AC40/1400/−20% | 486 | 47 | 10.34 | 2.8 | 375 |
| 25 | AC40/1500/−20%/1500 | 386 | 8 | 46.25 | 4.4 | 345 |
| 26 | AC40/1500/−20%/1700 | 135 | 0.6 | 225 | 4.1 | 350 |
| 27 | BP2/2600 | 270 | 0.1 | 2700 | 5.0 | 340 |

EXAMPLES 28-32

Using sodium as the dopant the effects of various anions on the ammonia yield has also been investigated in Examples 28-32. The catalysts comprises 2.7% weight sodium/5% weight ruthenium added as in Example 5.

| Example | Sodium Compound | Ammonia Yield % | T Max °C. |
|---------|-----------------|-----------------|-----------|
| 28 | Acetate | 2.3 | 400 |
| 29 | Carbonate | 1.9 | 420 |
| 30 | Phosphate(tribasic) | 1.25 | 450 |
| 31 | Iodide | 0.3 | >450 |
| 32 | Chloride | 0 | — |

Examples 31 and 32 show the importance in removing halide ions, particularly chloride, if these have been used in the preparation of the catalyst.

The standard catalyst's resistance to poisoning has also been investigated.

EXAMPLE 33

The catalyst comprised 5% Ru/10% Rb on BP2/2600 prepared as in Example 5. The usual test conditions of 5.17 bars(ga), stoichiometric N$_2$/H$_2$ (1:3) were established with a reaction temperature in the kinetically controlled region (340° C.) (4.3% NH$_3$ at 340° C.). The feed was then changed to N$_2$/H$_2$+50 vpm carbon monoxide. After 3 days no deterioration in catalyst activity had been observed (4.3% NH$_3$ at 340° C.). By comparison the activity of a commercial magnetite catalyst fell from 1.32% NH$_3$ to 0.18% NH$_3$ in 100 minutes.

EXAMPLE 34

The resistance to poisoning by water was examined with the same catalyst (5% Ru/10% Rb). The usual reaction conditions were established (5.17 bars(ga), 340° C.) and the ammonia yield determined (4.2%). The reactor was then depressured and 100 ml water were injected into the gas stream. On re-pressuring the ammonia yield had fallen slightly but recovered to its original level within 15 minutes.

EXAMPLES 35-44

The use of alternative transition metals to ruthenium has also been investigated in Examples 35-44. The catalysts were prepared using BP2/2600° C. as a support. The main metal was added first from aqueous solution. The catalyst was then dried, and reduced at 500° C. in flowing hydrogen. The dopant metal was then added from aqueous solution and the catalyst heat treated in nitrogen at 500° C. (The dopant metal concentration was always 0.12 mol %).

| Example | Main Metal | Dopant Metal | Ammonia Yield % | T Max °C. |
|---|---|---|---|---|
| 35 | 10% Rhodium | 0.7% Li | 0.6 | 300 |
| 36 | | 2.9% Mg | 0.26 | — |
| 37 | | 4.8% Ca | 0.36 | — |
| 38 | | 16.4% Ba | 0.55 | 500 |
| 39 | | 16.0% Cs | 0.65 | 500 |
| 40 | 10% Cobalt | 4.8% Ca | 0.31 | — |
| 41 | | 0.7% Li | 0.22 | — |
| 42 | | 16.4% Ba | 0.72 | 450 |
| 43 | | 2.9% Mg | 0.30 | — |
| 44 | | 20.0% La | 0.25 | — |

EXAMPLES 45-63

These examples discloses the use of catalysts of differing ruthenium and rubidium contents. In each case, the catalyst was prepared as in Example 1.

| Example | % weight Ruthenium | % weight Rubidium | T Max °C. | Ammonia Yield % |
|---|---|---|---|---|
| 45 | 1.0 | 0 | — | 0 |
| 46 | | 1 | 425 | 1.36 |
| 47 | | 5 | 390 | 2.24 |
| 48 | | 10 | 380 | 2.72 |
| 49 | 3.0 | 0 | — | 0 |
| 50 | | 1.0 | 425 | 1.61 |
| 51 | | 5.0 | 370 | 3.3 |
| 52 | | 10.0 | 370 | 3.3 |
| 53 | 5.0 | 0 | 500 | 0.4 |
| 54 | | 3.0 | 380 | 2.5 |
| 55 | | 5.0 | 370 | 3.3 |
| 56 | | 10.0 | 360 | 3.5 |
| 57 | 10.0 | 0 | 475 | 0.5 |
| 58 | | 5 | 360 | 3.5 |
| 59 | | 10 | 350 | 4.4 |
| 60 | | 20 | 340 | 5.2 |
| 61 | 20 | 5 | 350 | 3.9 |
| 62 | | 10 | 340 | 5.2 |
| 63 | | 20 | 340 | 5.2 |

We claim:

1. A method for the preparation of a catalyst comprising the steps of impregnating a graphite-containing carbon having (a) a basal plane surface area of at least 100 m²/g, (b) a ratio of BET surface area to basal plane surface of not more than 8:1, and (c) a ratio of basal plane surface area to edge surface area of at least 2:1 with a solution of a ruthenium compound to give a metal content of 0.1 to 50% by weight thereto, and a solution of a modifying metal ion selected from the group consisting of potassium, rubidium and barium to give a modifying metal ion concentration of 0.1 to 4 times by weight of the transition metal thereto, said impregnations of said graphite-containing carbon being on a sequential basis and with said impregnated graphite-containing carbon being reduced after at least the ruthenium impregnation to reduce the ruthenium compound present therein.

2. A metal in accordance with claim 1, wherein the modifying metal is a rubidium ion.

3. A method in accordance with claim 1, wherein the modifying metal is a barium ion.

4. A method in accordance with claim 1, wherein the modifying metal is a potassium ion.

5. The product of the process as defined in claim 1.

* * * * *

UNITED STATES PATENT AND TRADEMARK OFFICE
CERTIFICATE OF CORRECTION

PATENT NO. : 4,250,057
DATED : February 10, 1981
INVENTOR(S) : Alan I. Foster, Peter G. James, John J. McCarroll and Stephen R. Tennison It is certified that error appears in the above—identified patent and that said Letters Patent is hereby corrected as shown below:

In claim 2, line 1, change "metal" to --method--.

Signed and Sealed this

Twenty-sixth Day of May 1981

[SEAL]

Attest:

RENE D. TEGTMEYER

*Attesting Officer*   *Acting Commissioner of Patents and Trademarks*